(12) United States Patent
Regimbal et al.

(10) Patent No.: US 10,303,206 B2
(45) Date of Patent: May 28, 2019

(54) INFORMATION HANDLING SYSTEM SUPER ELASTIC SPRING HINGE

(71) Applicant: Dell Products L.P., Round Rock, TX (US)

(72) Inventors: Laurent A. Regimbal, Georgetown, TX (US); Jason S. Morrison, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/609,811

(22) Filed: May 31, 2017

(65) Prior Publication Data

US 2018/0348818 A1 Dec. 6, 2018

(51) Int. Cl.
| | | |
|---|---|---|
| *G06F 1/16* | (2006.01) |
| *H05K 5/00* | (2006.01) |
| *H05K 7/00* | (2006.01) |
| *F16C 11/04* | (2006.01) |
| *E05D 11/08* | (2006.01) |
| *E05D 3/02* | (2006.01) |

(52) U.S. Cl.
CPC ............ *G06F 1/1615* (2013.01); *E05D 3/02* (2013.01); *E05D 11/082* (2013.01); *F16C 11/04* (2013.01); *G06F 1/1679* (2013.01); *G06F 1/1681* (2013.01); *E05Y 2900/606* (2013.01)

(58) Field of Classification Search
CPC .... G06F 1/1613; G06F 1/1615; G06F 1/1616; G06F 1/1633

USPC ............ 361/679.26–679.29, 679.55, 679.56
See application file for complete search history.

(56) References Cited

U.S. PATENT DOCUMENTS

| | | | | |
|---|---|---|---|---|
| 8,953,327 B1* | 2/2015 | Salmon | ................. | G06F 1/1652 160/242 |
| 2005/0046374 A1* | 3/2005 | Ogawa | ................. | G06F 1/1616 318/614 |
| 2008/0139260 A1* | 6/2008 | Kauhaniemi | ....... | H04M 1/0237 455/575.4 |
| 2008/0248248 A1* | 10/2008 | Caine | .................... | G06F 1/1616 428/152 |
| 2013/0010405 A1* | 1/2013 | Rothkopf | ............ | H04M 1/0216 361/679.01 |
| 2016/0091933 A1* | 3/2016 | Rockford | ................... | C09J 7/22 361/679.55 |
| 2018/0004252 A1* | 1/2018 | Ahrens | ................... | E05D 3/022 |
| 2018/0092253 A1* | 3/2018 | Qiu | .................... | H05K 7/20509 |

OTHER PUBLICATIONS

Wikipedia, Belleville washer, printed Aug. 31, 2017.

* cited by examiner

*Primary Examiner* — Anthony M Haughton
(74) *Attorney, Agent, or Firm* — Zagorin Cave LLP; Robert W. Holland

(57) ABSTRACT

An information handling system hinge provides friction against rotational motion to generate torque that regulates housing portion relative position. Friction is generated by compression of friction elements with a super elastic wire under tension. For example, a nickel titanium alloy wire under two to eight percent strain provides a relatively low spring rate having consistent compression even as wear reduces the size of the friction elements.

13 Claims, 5 Drawing Sheets

INFORMATION HANDLING SYSTEM SUPER ELASTIC SPRING HINGE

BACKGROUND OF THE INVENTION

Field of the Invention

The present invention relates in general to the field of information handling system portable housings, and more particularly to an information handling system super elastic spring hinge.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate I/O devices and internal power to operate free from fixed resources, such as power outlets and peripheral devices. A typical portable information handling system integrates a display device to present information as visual images. Often the display device includes a touchscreen that accepts end user inputs. In some cases, touchscreen displays provide the only integrated input device; however, more advanced systems often include an integrated keyboard so that an end user can make keyed inputs. Generally, integrated keyboards are built into rotationally coupled housing portions. One housing portion holds the keyboard and acts as a base stand that holds the other portion with the integrated display in a viewing position.

Generally, end users desire low profile and light weight portable information handling systems. Minimizing housing size presents a challenge since end users also expect a robust system that will survive multiple cycles of rotations. Hinges that couple rotating portions to each other also should provide consistent movement and feel of the housing portions during rotation. To accomplish these goals, hinges typically generate torque by pressing 2 or more rotating surfaces together with a force, such as a force generated by compression of a spring. The torques generated is proportional to the coefficient of friction of the contact interface, the force pressing the contacts together and the mean radius of the contacting area.

In a typical hinge, a stack of Bellville washers are used as a spring to generate very high loads in a small diameter. The spring rates are very high for this type of spring so that the load generated is sensitive to changes in compression. To hit a designed nominal torque, the hinge manufacturers calibrate hinges by adjusting a nut that sets compression on the spring until the desired hinge torque is achieved. However, over time two main factors contribute to torque changes at a hinge. One factor is the change in friction that results as material is removed due to wear. Material removal decreases the compression distance on the stack of Bellville springs with less compression on a spring meaning generation of less torque. Springs with very high spring rates, such as Bellville washers tend to have losses in overall torque of the hinge as surfaces wear. Another factor relates to grease or other lubricants used on friction surfaces to slow down wear. Lubricants reduce wear, however, they also lower the coefficient of friction. As hinges cycle, lubricants tend to slowly migrate out of the friction interface, which increases the coefficient of friction and hinge torque over time. Together, these two factors tend to reduce the predictability of hinge performance.

SUMMARY OF THE INVENTION

Therefore, a need has arisen for a system and method which generates torque at a hinge in a more predictable manner.

In accordance with the present invention, a system and method are provided which substantially reduce the disadvantages and problems associated with previous methods and systems for generating torque at a hinge. A super elastic wire under tension compresses friction elements that provide torque responsive to hinge rotation.

More specifically, a portable information handling system integrates processing components and a display into rotationally couple housing portions. One or more hinges couple the housing portions to each other, such as to support rotation of the housing portions from closed to open positions relative to each other. Each hinge has first and second brackets that rotate about an axle or similar structure. Friction elements disposed between portions of the brackets create torque that opposes rotation of the hinges. To compress the friction elements against each other and create a predictable and repeatable torque, a super elastic wire is stretched under tension. For example, a nickel titanium wire under two to eight percent strain compresses the friction elements so that a constant torque is generated. In one embodiment, the hinge assembles and operates without lubrication. Wear at the friction elements that changes the size of the friction elements over time does not have a substantial impact on compression provided by the super elastic wire due to the super elastic material's low spring rate.

The present invention provides a number of important technical advantages. One example of an important technical advantage is that a super elastic wire compression source maintains a relatively constant compression force over a wide range of strains to provide a relatively low spring rate. The low spring rate improves compressive force predictability and reduces sensitivity to wear of friction components. Reduced sensitivity to wear reduces or eliminates the need for lubrication at the friction components, resulting in improved torque stability. Ultimately, with higher friction provided by a lack of lubrication, lower compressive force is needed to generate a given torque so that reduced stress from generation of friction compression is spread across the hinge, allowing for smaller hinge sizes. Further manufacture of the hinge is simplified by reducing or eliminating the need for calibration of torque at the hinge.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A hinge compresses frictional elements with a super elastic wire under tension to provide torque responsive to hinge rotation, such as for supporting rotational coupling of information handling system housing portions. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
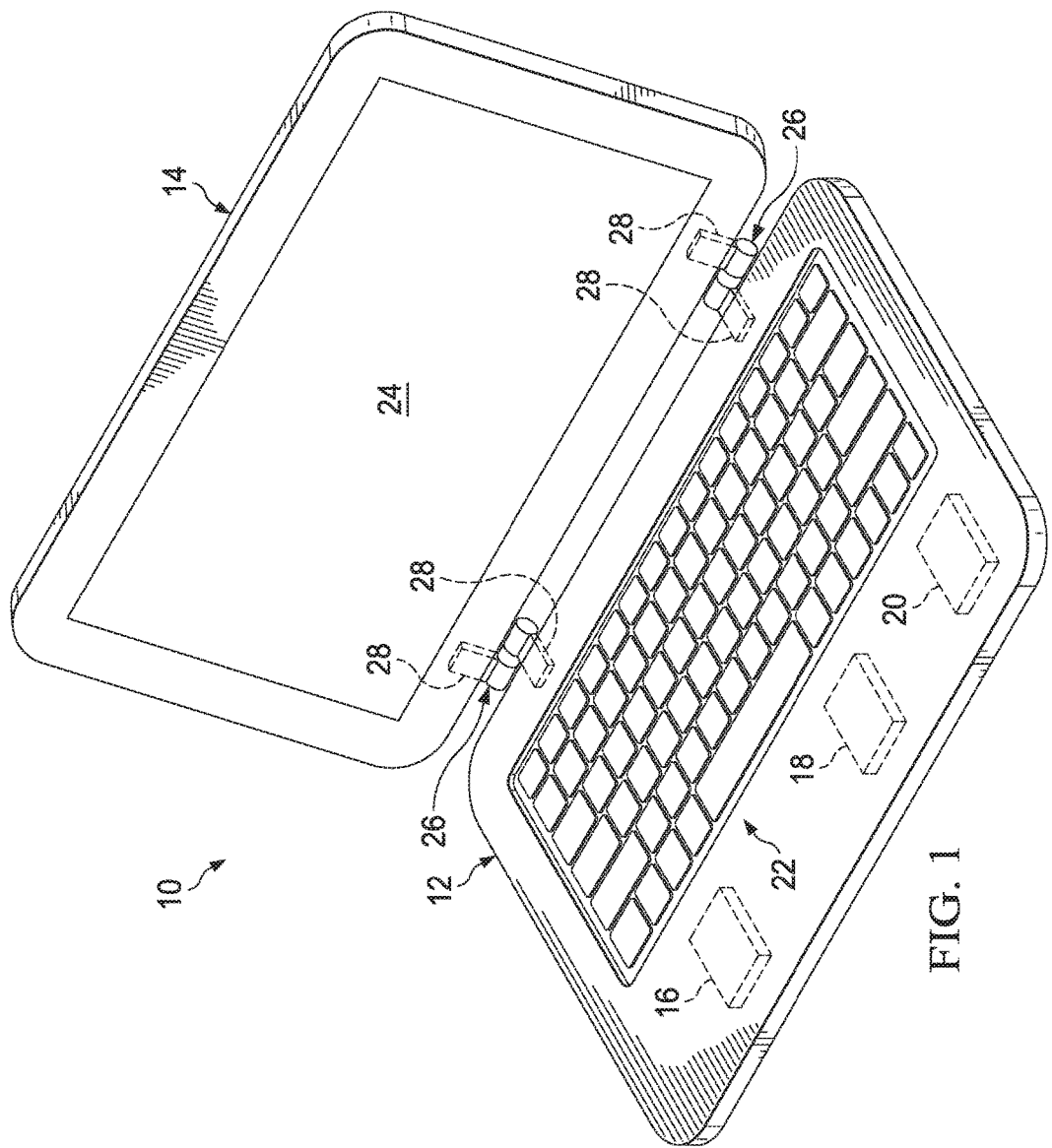
FIG. 1 depicts a block diagram of an information handling system having housing portions rotationally coupled to each other.

Referring now to FIG. 1, a block diagram depicts an information handling system 10 having housing portions 12 and 14 rotationally coupled to each other. Information handling system 10 processes information with processing components disposed in base housing portion 12, such as CPU 16 that executes instructions to process information, RAM 18 that stores the instructions and information, and a chipset 20 that manages physical devices like graphics and input/output (I/O) devices. Lid housing portion 14 integrates a display that presents information as visual images, such as with pixel values provided from a graphics processor in chipset 20. A keyboard 22 integrates in the upper surface of base housing portion 12 to cover the processing components. In operation, an end user rotates lid portion 14 ninety degrees to an open position that exposes keyboard 22. Hinges 26 attach to each housing portion 12 and 14 with a bracket 28 to provide rotational movement of the housing portions relative to each other. Hinges 26 include friction elements that provide torque to hold housing portions in position relative to each other. For example, a user applies rotational force to move the housing portions to a desired relative orientation and the housing portions remain in the relative orientation until the user applies force again. In alternative embodiments, alternative types of housing configurations may be used, including detachable keyboard bases or other types of arrangements.

Figure 2:
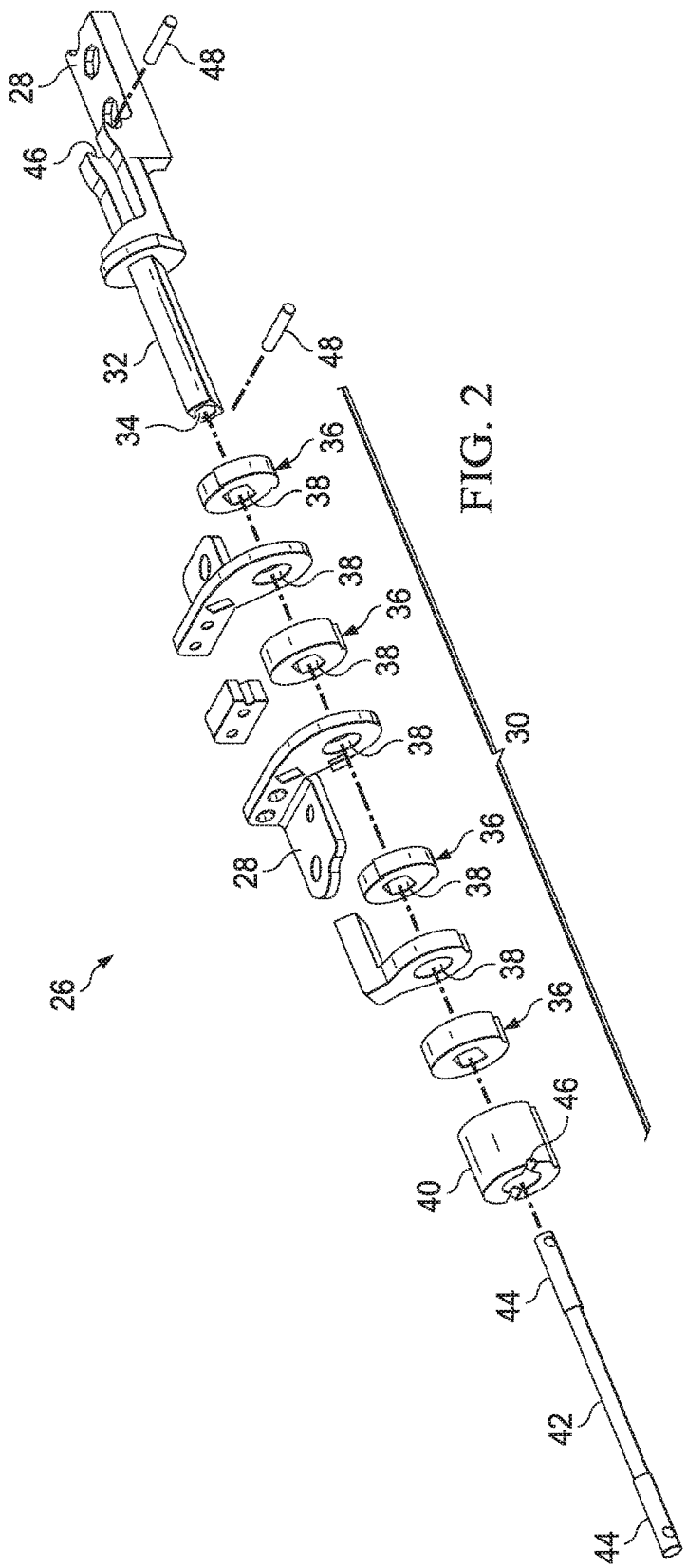
FIG. 2 depicts a blown-up view of a hinge having friction compression provided by a super elastic wire under tension.

Referring now to FIG. 2, a blown-up view depicts a hinge 26 having friction compression provided by a super elastic wire 42 under tension. In the example embodiment, hinge 26 has two brackets that each couple to separate housing portions. One bracket 28 forms an axle 32 with a tunnel 34 through the center. The other bracket 28 extends out a series of spaced arms that have openings 38 sized to accept axle 32. Friction elements 36, each also having openings 38 to accept axle 32, fit between the arms of bracket 28 to form a torque generator 30 that creates torque as brackets 28 rotate relative to each other. The amount of torque created by torque generator 30 depends upon the amount of compression applied to friction elements 36 once assembled within the arms of bracket 28. To establish compression, an end cap 40 presses upon one end of torque generator 30 to create a compressive force against bracket 28 at the base of axle 32. A super elastic wire 42 inserts through the openings 38 and tunnel 34 so that a coupling end 44 is exposed at pin rests 46 on opposing sides of torque generator 30. Super elastic wire 42 has a length of less than the assembled but uncompressed torque generator 30 so that a compressive force is applied by an external tool in order to space for coupling pins 48 to engage coupling ends 44 at pin rests 46. In the example embodiment, friction elements 36 are held in a fixed position relative to axle 32 so that, as brackets 28 rotate relative to each other, friction elements 36 engage against the arms of the other bracket 28. In alternative embodiments, alternative ways of translating rotational force into friction may be used, as may different compressive arrangements for the super elastic wire 42. For example, a loop of wire may couple to one end of a bracket 28 or multiple wires may be used.

Figure 3:
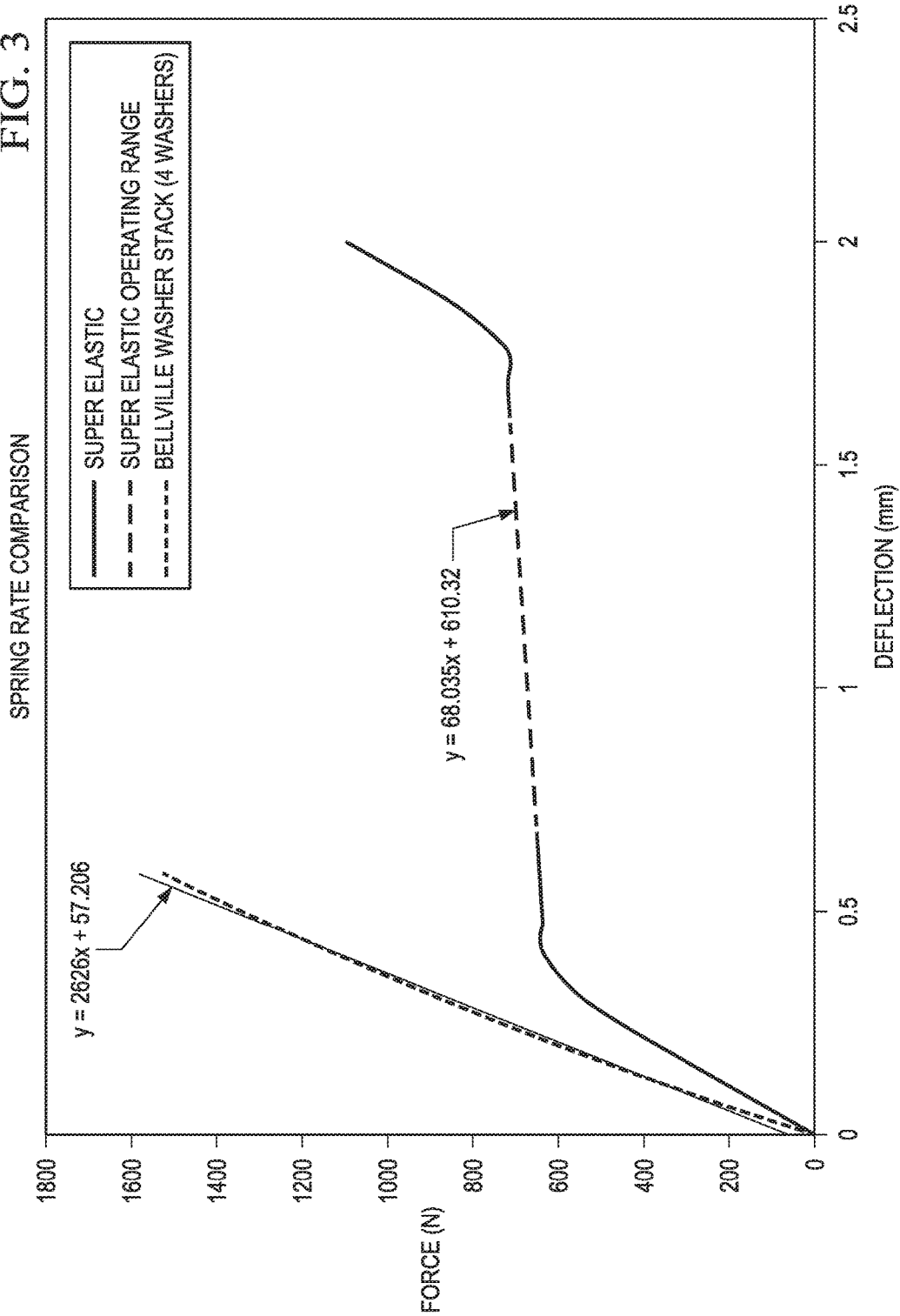
FIG. 3 depicts a spring rate comparison between conventional Bellville spring and tensioned nickel titanium wire.

Referring now to FIG. 3, a spring rate comparison is depicted between a conventional Bellville spring and tensioned nickel titanium wire. In the example, a nickel titanium alloy wire operating in the super elastic region has a spring rate nearly forty times lower than the stack of 4 Bellville washers. As is evident from the flat portion of the graph, the nickel titanium wire has a fairly constant force over nearly one millimeter of deflection. In the example graph, 1 mm of deflection on the wire will stay in the super elastic region for the example wire with 2 to 8% strain. Deflection does depend upon wire length with the example wire having a length of 16-17 mm, however wire length may determine the spring deflection characteristics. For example, a 100 mm long wire deflects 2 to 8 mm in the super elastic region. Wire diameter then determines the amount of force that the wire generates with the wire acting as a pre-loaded extension spring having a very low spring rate. Since the compression remains constant over a greater deflection distance, the super elastic wire offers consistent friction generated by the compressive force even as friction elements wear over time to less thickness. In order to obtain the consistent compressive force depicted by the flat portion of the graph of FIG. 3, nickel titanium wire is placed under tension to within a range of two to eight percent of strain. In a manufacturing environment, with normal manufacturing tolerances, the nickel titanium wire is designed to have a length relative to the hinge structure that will assemble under tension at as close to eight percent of strain as possible. For example, strain is set so that the maximum possible strain when accounting for manufacturing tolerance of the assembly is eight percent. With the relatively generous deflection available at relatively constant compression, assembly within normal manufacturing tolerances does not need calibration. As the friction elements wear over time, the strain can decrease to as low as two percent with minimal impact on hinge torque. For example, using typical friction element wear rates and the spring rate of a nickel titanium wire, 0.61 mm of material loss would have to occur to experience a 20% torque degradation. By comparison, with a conventional Bellville spring assembly 0.0016 mm of friction element material degradation would produce a 20% torque degradation. Based upon the greater allowed degradation with the super elastic wire compressive force, lubrication between the friction elements may be eliminated so that coefficient of friction remains constant over time.

Figure 4:
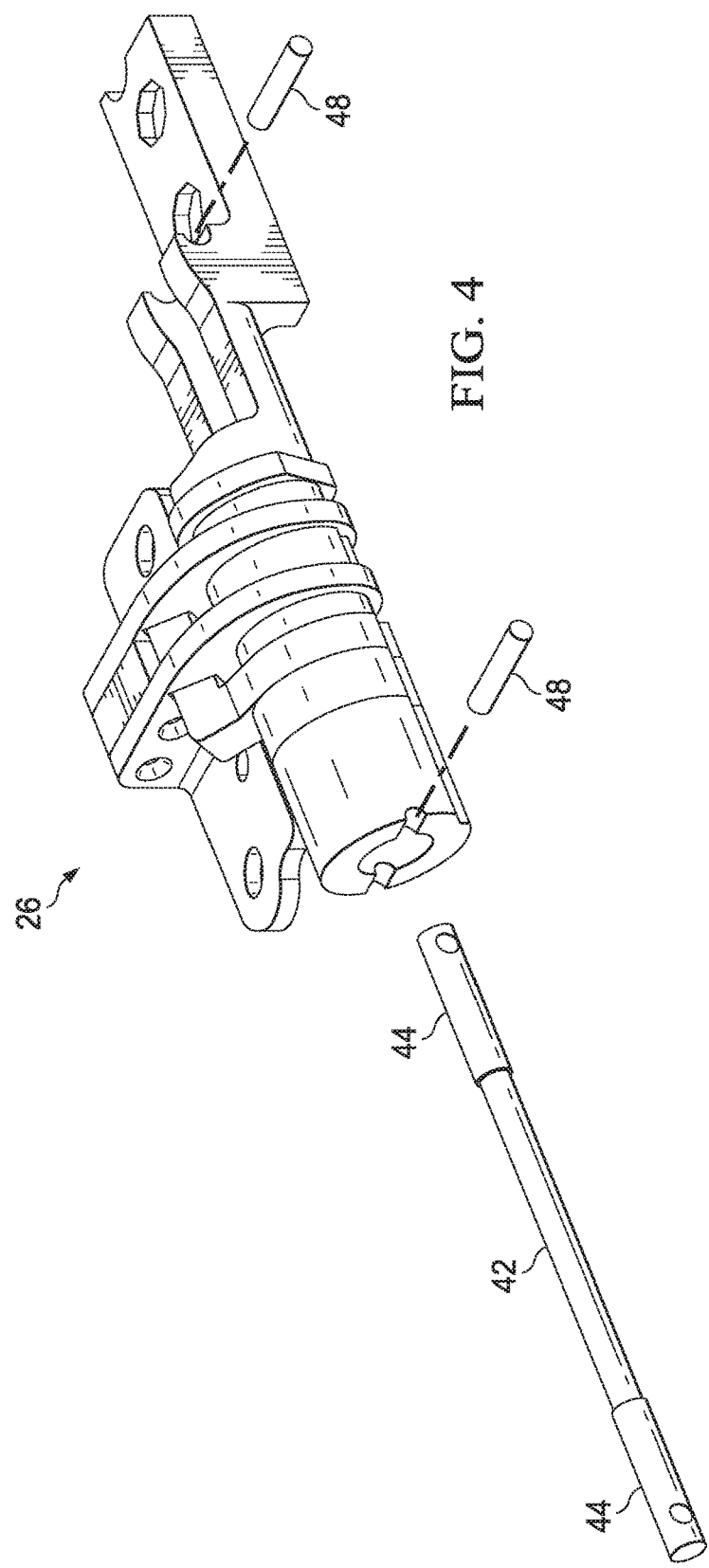
FIG. 4 depicts a hinge configured to accept a super elastic wire for compression of friction elements.

Referring now to FIG. 4, a hinge 26 is depicted configured to accept a super elastic wire 42 for compression of friction elements 36. Ease of assembly of hinge 26 is illustrated with wire 42 aligned to enter the openings of the assembled friction elements. Once wire 42 inserts, tension is applied to increase the length of wire 42 so that pins 48 insert at each end to hold wire 42 in place and compressing friction elements 36. In alternative embodiments, alternative devices may be used to maintain tension on the wire 42.

Figure 5:
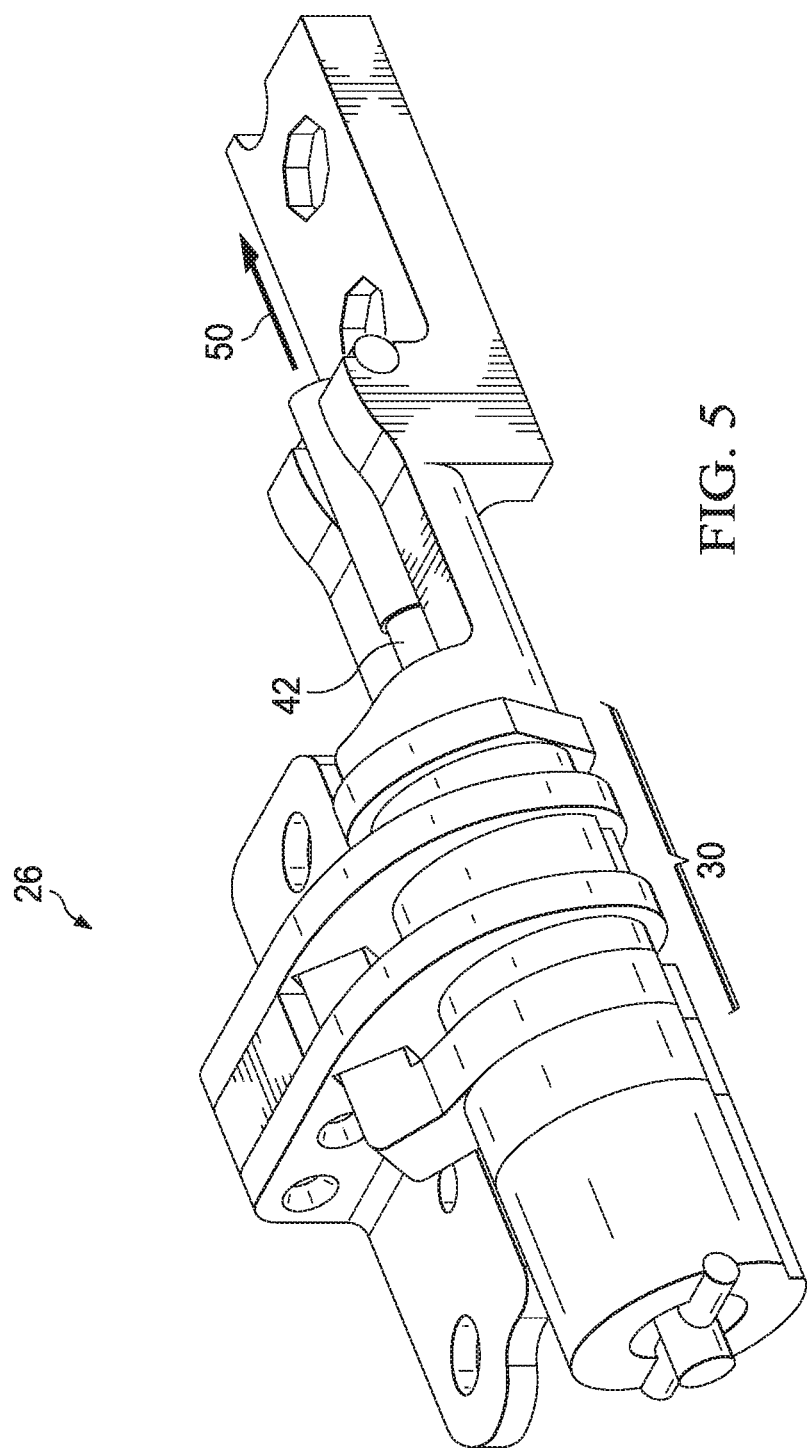
FIG. 5 depicts an assembled hinge having a tensioned super elastic wire compressing friction elements.

Referring now to FIG. 5, an assembled hinge is depicted having a tensioned super elastic wire compressing friction elements. As indicated by arrow 50, a tension force applied to wire 42 stretches wire 42 so that pins 48 insert into coupling ends 44. Torque generator 30 may be modified to provide desired torque responses based upon rotational angles. For example, torque generated by friction depends upon the coefficient of friction of opposing materials and the surface area subject to frictional forces. Thus, for example, friction elements 36 may vary the coefficient of friction or the surface area at different relative rotational positions so that torque depends upon rotational position. For instance, the last 20 degrees of closing motion of housing portions relative to each other may have less torque to make closing the system easier. Similarly, rotational positions that relate to viewing angles may have increased coefficients of friction or surface area so that housing portions in a viewing position will be less apt to move.

Although the present invention has been described in detail, it should be understood that various changes, substitutions and alterations can be made hereto without departing from the spirit and scope of the invention as defined by the appended claims.

What is claimed is:

1. An information handling system comprising:
   first and second housing portions;
   a processor disposed in at least one housing portion and operable to execute instructions to process information;
   a memory disposed in at least one housing portion and interfaced with the processor, the memory operable to store the instructions and information;
   a hinge coupled to the first and second housing portions, the hinge coupled to the first housing portion by a first bracket and coupled to the second housing portion by a second bracket, the hinge rotationally coupling the first and second housing portions to each other; and
   a torque generator integrated in the hinge and operable to resist rotation of the hinge, the torque generator comprising first and second friction elements compressed against each other by a super elastic wire held in tension with a predetermined strain range, the first friction element maintaining alignment with the first bracket, the second friction element maintaining alignment with the second bracket, the torque generator resisting rotation by friction of the first friction element rotating relative to the second friction element.

2. The information handling system of claim 1 wherein the super elastic wire comprises a nickel titanium alloy.

3. The system of claim 2 wherein the nickel titanium wire predetermined strain range comprises two percent to eight percent.

4. The system of claim 1 wherein the first and second friction elements are non-lubricated friction elements.

5. The system of claim 1 wherein the friction elements vary torque based upon rotational angle by varying a contact area based upon rotational angle.

6. The system of claim 1 wherein the friction elements vary torque based upon rotational angle by varying a coefficient of friction based upon rotational angle.

7. The system of claim 1 wherein the torque generator comprises:
   first and second brackets adapted to couple to the housing portions, the first bracket forming openings, the second bracket forming an axle sized to fit in the openings and having a tunnel; and
   plural friction elements, each having an opening sized to fit the axle;
   wherein the axle inserts through the first bracket and friction element openings and the super elastic wire inserts through the tunnel.

8. The system of claim 7 wherein the super elastic wire terminates at each end with a coupling device located to establish a wire length having a predetermined relationship with a length of the tunnel.

9. The system of claim 7 further comprising an end cap disposed at one end of the tunnel, the end cap having a length sized to establish a predetermined strain on the super elastic wire.

10. A hinge comprising:
    first and second brackets configured to rotationally engage with each other;
    an axle fixed to the first bracket, the second bracket having an opening, the axle inserted through the opening, the second bracket rotating about the axle relative to the first bracket;
    first and second friction elements disposed to resist rotation of the first and second brackets relative to each other by contact of the first friction element against the second friction element, the first friction element maintained in alignment with the first bracket, the second friction element maintained in alignment with the second bracket; and
    a super elastic wire configured to compress the first and second friction elements against each other by a predetermined tension placed on the super elastic wire.

11. The hinge of claim 10 wherein the super elastic wire comprise nickel titanium alloy.

12. The hinge of claim 11 wherein the predetermined tension comprises a strain of two to eight percent.

13. The hinge of claim 12 wherein the hinge rotates without any lubricant.

* * * * *